United States Patent [19]

Masuda et al.

[11] Patent Number: 5,182,550
[45] Date of Patent: Jan. 26, 1993

[54] INTER-NETWORK CONNECTION SYSTEM

[75] Inventors: Toru Masuda, Fujisawa; Akinori Kamijo, Kawasaki, both of Japan

[73] Assignee: Fujitsu Limited, Kawasaki, Japan

[21] Appl. No.: 563,673

[22] Filed: Aug. 1, 1990

Related U.S. Application Data

[63] Continuation of Ser. No. 271,409, Nov. 14, 1988, abandoned, which is a continuation of Ser. No. 865,822, May 22, 1986, abandoned.

[30] Foreign Application Priority Data

May 31, 1985 [JP] Japan .................................. 60-116807

[51] Int. Cl.$^5$ .............................................. H04J 3/08
[52] U.S. Cl. ........................... 340/825.05; 340/825.03; 340/825.52; 370/85.13; 370/85.14
[58] Field of Search ....................... 340/825.02, 825.01, 340/825.03, 826, 827, 825.04, 825.05, 825.52, 825.5; 370/85.9, 85.12, 85.13, 85.14

[56] References Cited

U.S. PATENT DOCUMENTS

| | | | |
|---|---|---|---|
| Re. 28,811 | 5/1976 | Pierce | 370/88 |
| 4,007,441 | 2/1977 | Faber | 370/88 |
| 4,287,592 | 9/1981 | Paulish et al. | 370/88 |
| 4,535,450 | 8/1985 | Tan | 370/88 |
| 4,627,052 | 12/1986 | Hoare et al. | 370/94 |
| 4,638,477 | 1/1987 | Okada et al. | 370/89 |

OTHER PUBLICATIONS

A. Belloni et al., "Routing and Internetworking," Apr. 1975, vol. 44, No. 4, pp. 194-210, *Alta Frequenza*.
J. F. Shoch, "Inter-Networking Naming, Addressing, and Routing," Sep. 1978, p. 73, lines 26-35; p. 77, lines 22-24; p. 78, lines 5-15, *Proceedings of The 17TH IEEE Computer Society International Conference Compcon Fall*, Washington, D.C.
Masamichi Hoshino, "Route setting System Between Network Nodes," Oct. 1983, vol. 7, No. 292, *Patent Abstracts of Japan*.
D. C. Butterworth et al., "System X: Common-Channel Signalling Progress on Installation and Testing," 1985, vol. 3, No. 4, pp. 255-258, *British Telecommunications Engineering*, London.
D. Einert et al., "The Snatch-Gateway: Translation of Higher Level Protocols," 1983, vol. 2, No. 1, pp. 83-102, *Journal of Telecommunications Networks*, Rockville, Md.
Deutsche Bundespost, "DAS CCITT—Zeichengabesystem Nr. 7," 1984, vol. 37, No. 2, pp. 27-70, *Unterrichtsblatter Fur Das Fernmeldewesen*, Hamburg, DE.
B. A. Nilsson et al., "AXe 10—A Review," 1980, vol. 57, No. 4, pp. 138-148, *Ericsson Review*, Stockholm SW.

*Primary Examiner*—Douglas W. Olms
*Assistant Examiner*—Ralph Smith
*Attorney, Agent, or Firm*—Staas & Halsey

[57] ABSTRACT

An inter-network connection system wherein a local signaling network including gateway offices of at least two signaling networks to be interconnected is configured between the signaling networks to be interconnected, and the inter-network connection is carried out through the local signaling network.

4 Claims, 17 Drawing Sheets

SIGNAL LINK ROUTE NUMBER
TRANSLATION TABLE

LSN ··· SIGNAL LINK ROUTE NUMBER

SIGNAL LINK ROUTE- SIGNALING
NETWORK ATTRIBUTE TRANSLATION TABLE

NID ··· SIGNALING NETWORK IDENTIFIER
NAT ··· SIGNALING NETWORK ATTRIBUTE
SSPC ··· FIRST OFFICE CODE

USER DATA- SIGNALING NETWORK IDENTIFIER
TRANSLATION TABLE

NID ··· SIGNALING NETWORK IDENTIFIER
DPC ··· DESTINATION OFFICE CODE
OPC ··· ORIGINATING OFFICE CODE

SIGNALING NETWORK IDENTIFIER- SIGNAL
ROUTE TRANSLATION TABLE

NID ··· SIGNALING NETWORK IDENTIFIER
NAT ··· SIGNALING NETWORK ATTRIBUTE
LSN ··· SIGNAL LINK ROUTE NUMBER

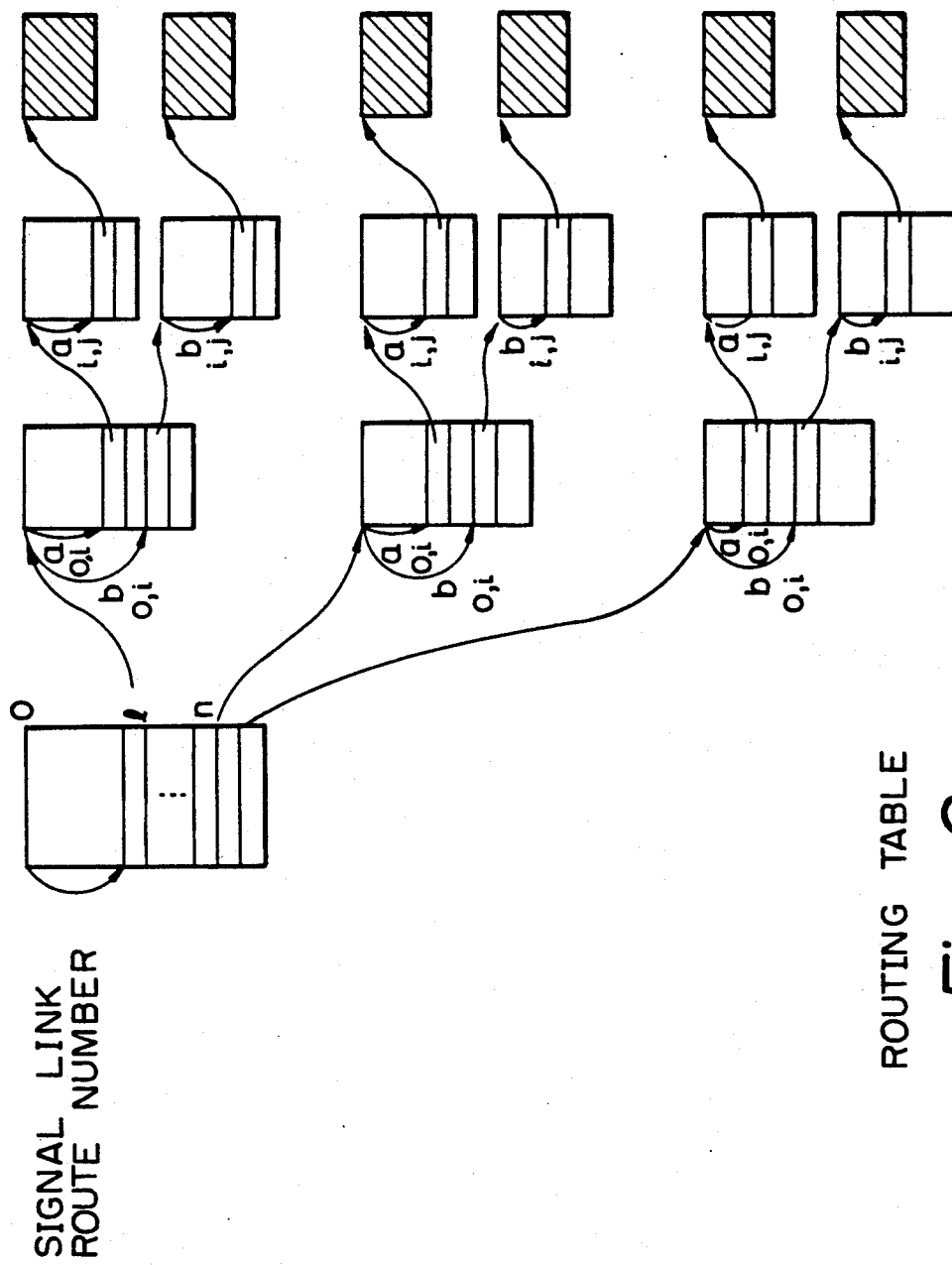
Fig. 9 ROUTING TABLE

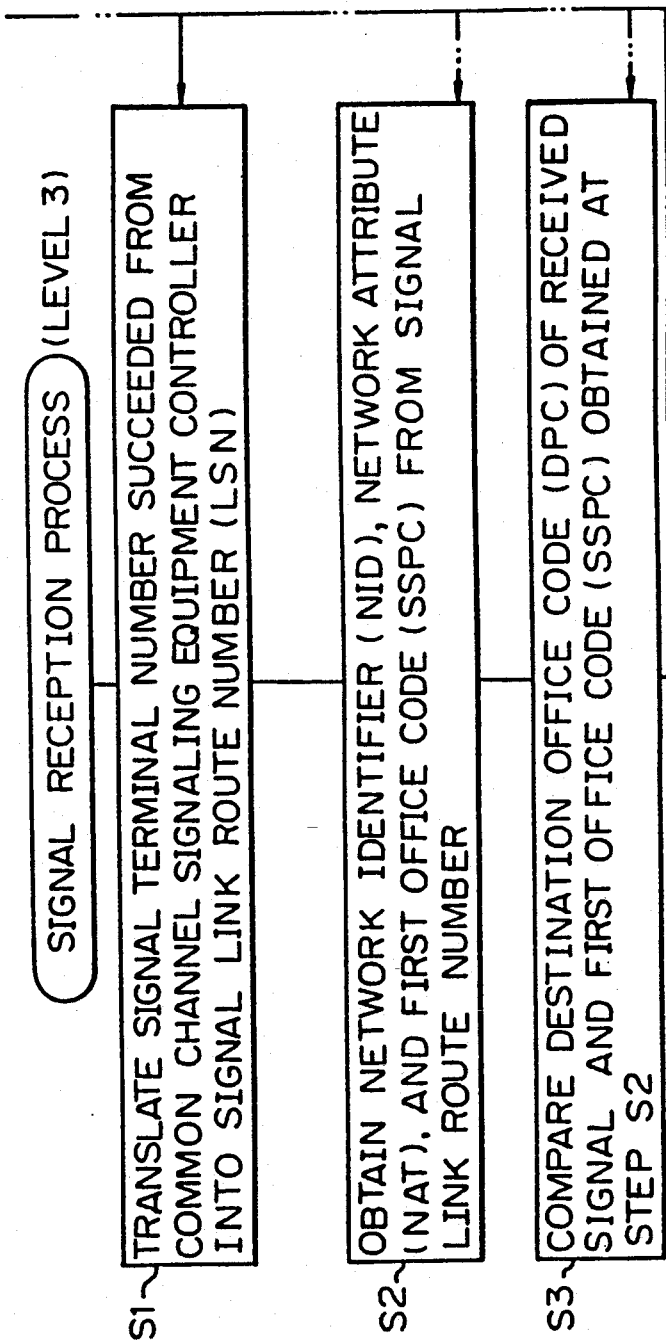

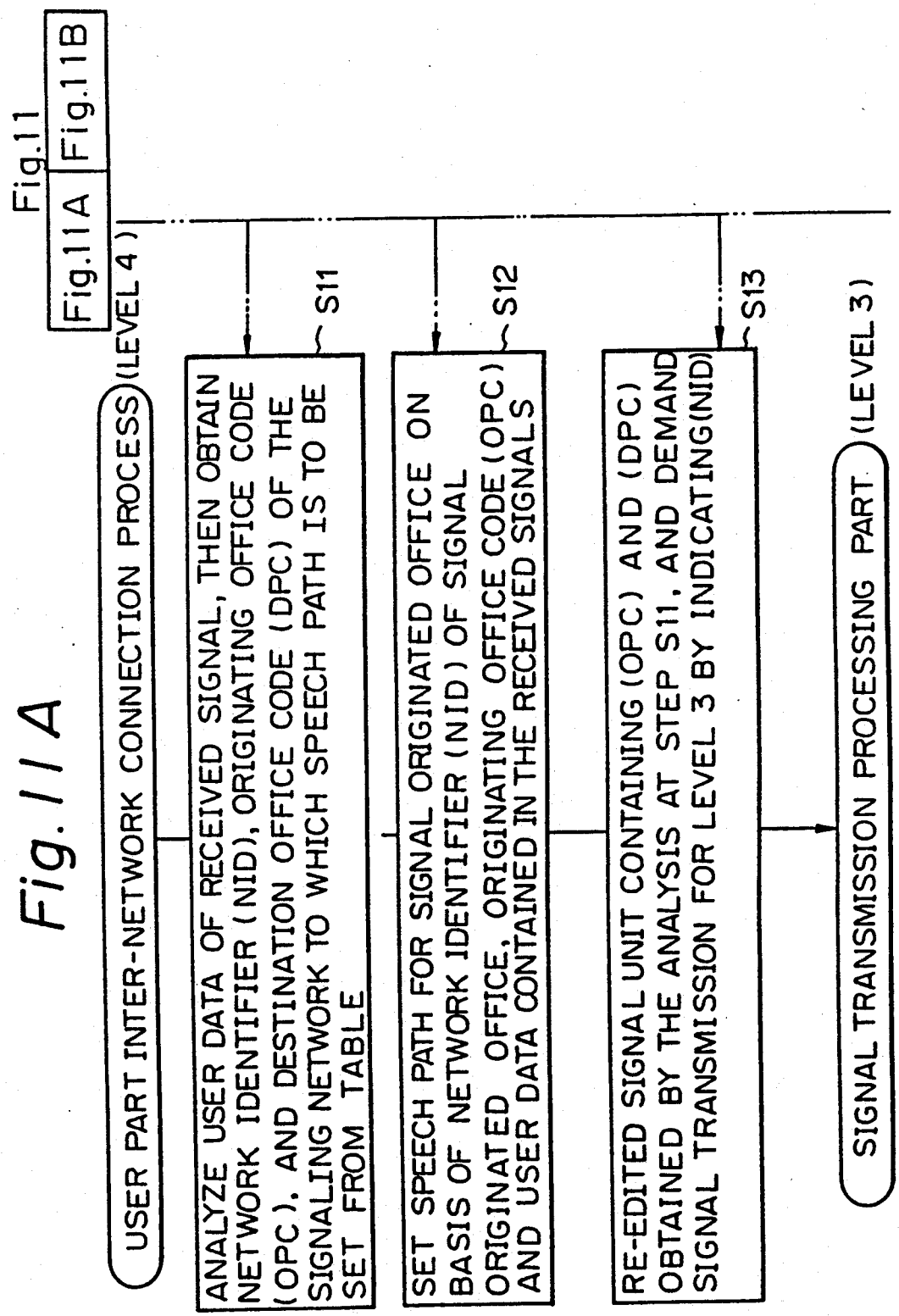

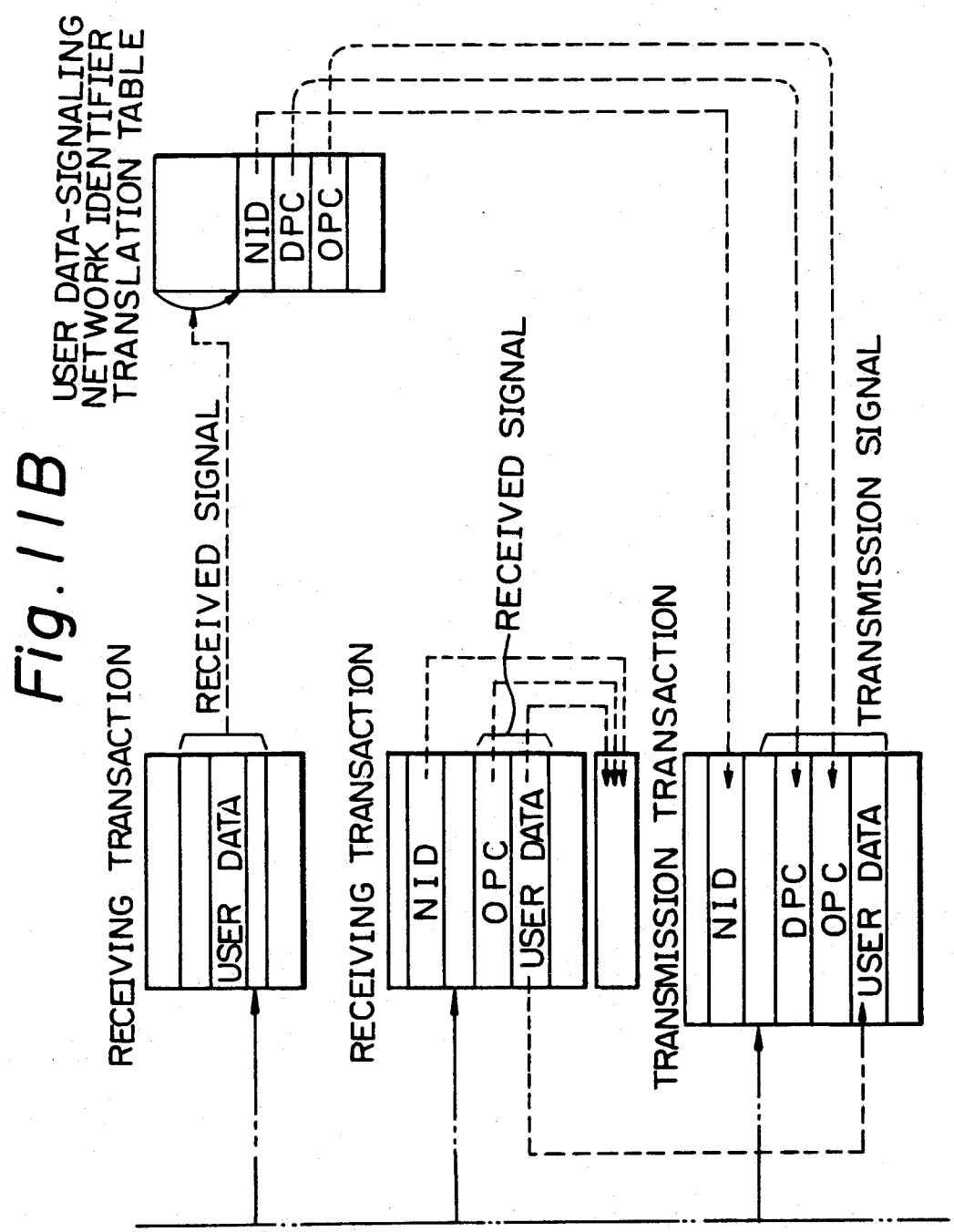

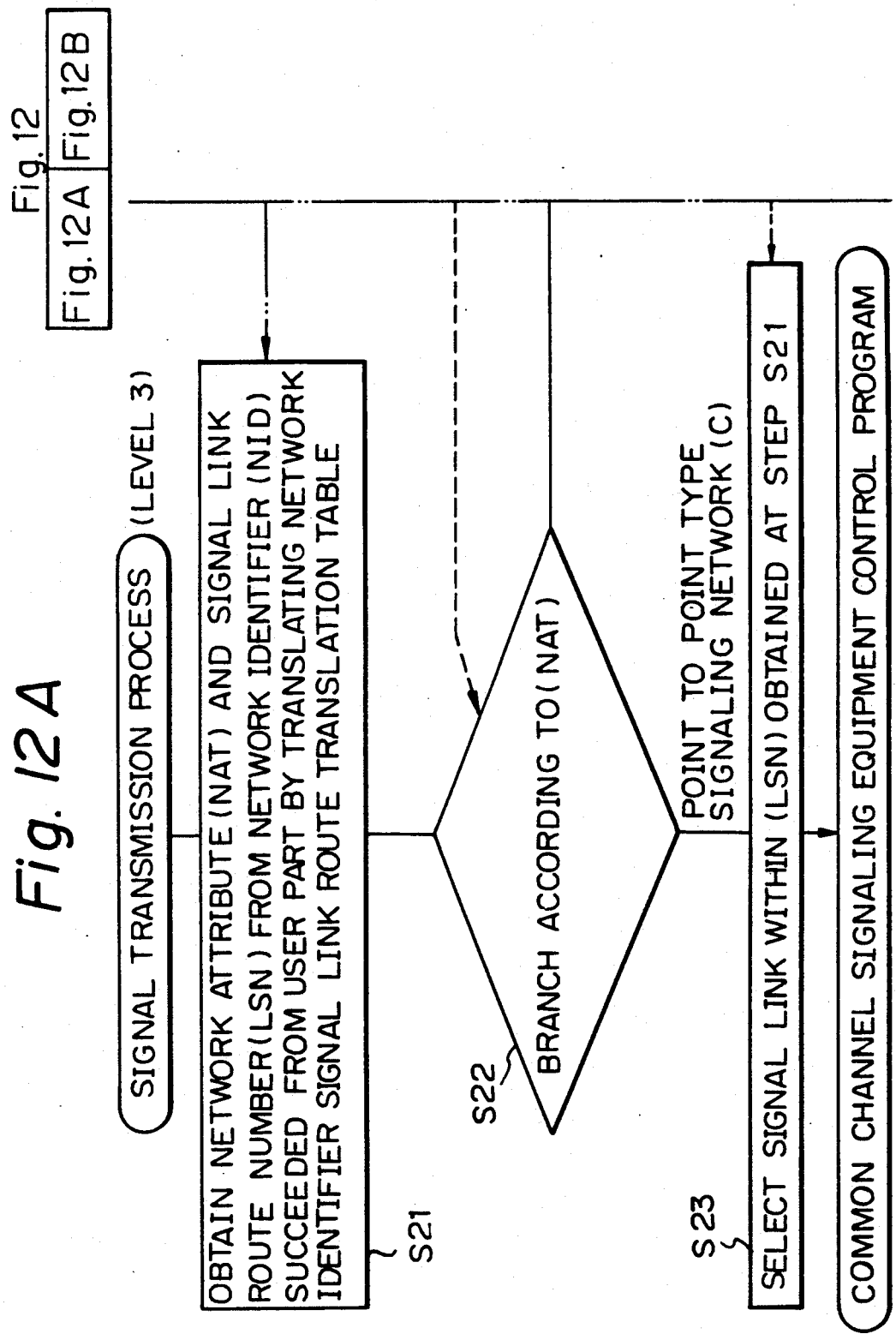

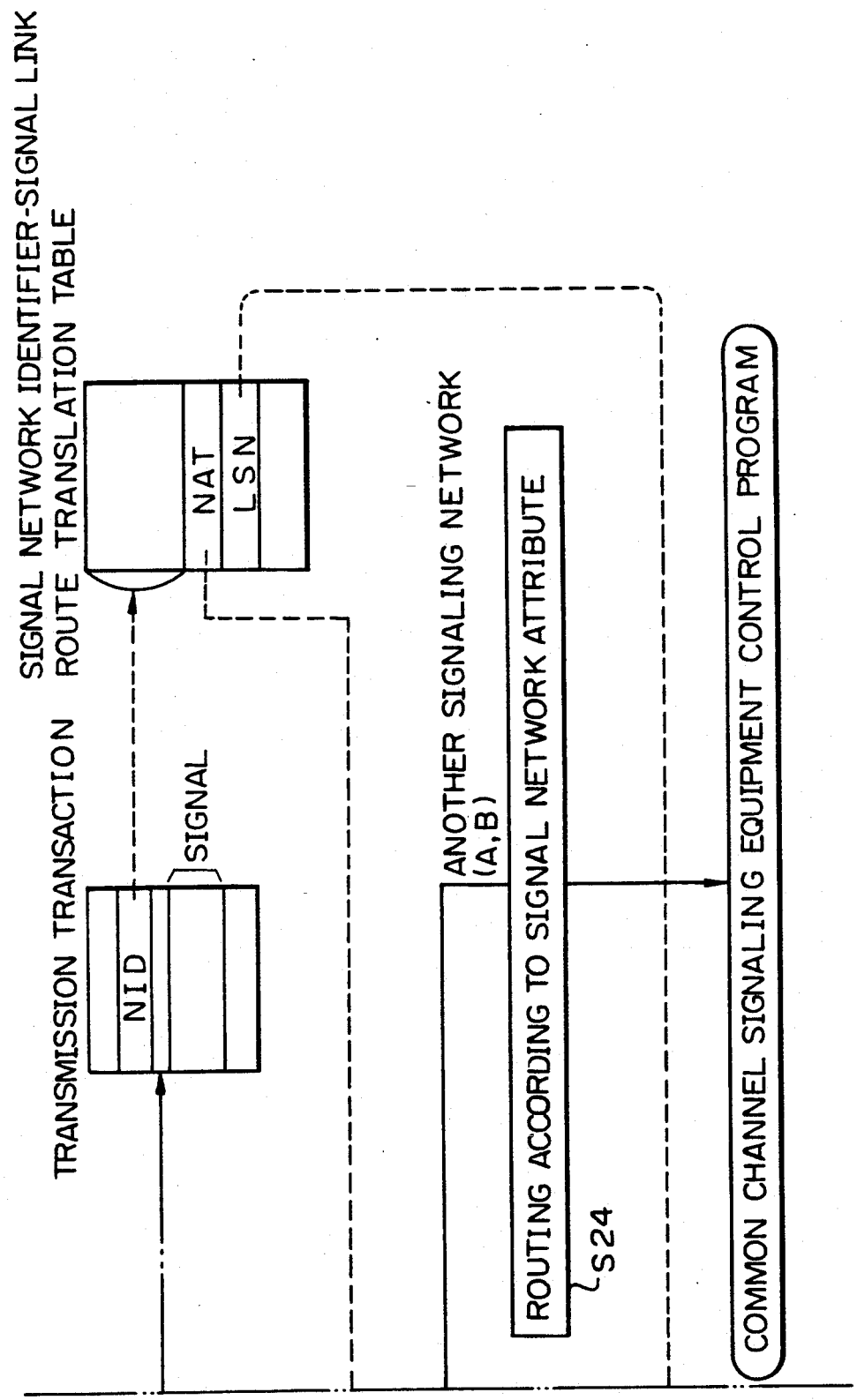

Fig. 15
(PRIOR ART)
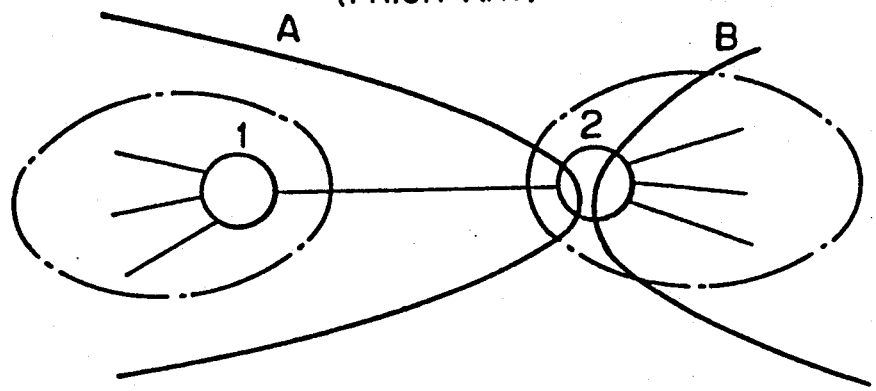
Fig. 16
(PRIOR ART)
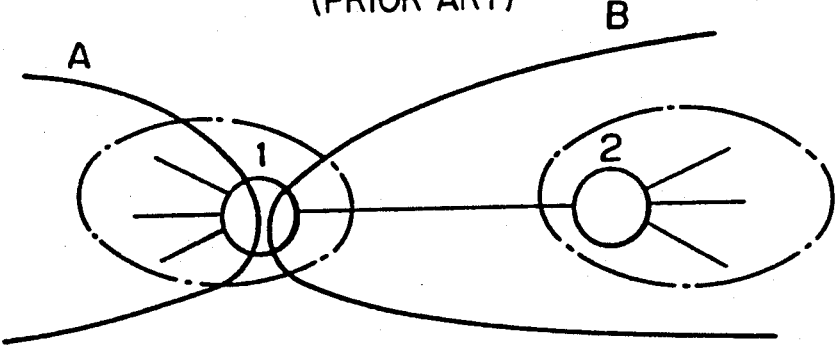
A, B ··· SIGNALING NETWORK
1, 2 ··· GATEWAY OFFICE
 ··· SIGNALING NETWORK BEFORE INTERCONNECTION
 ··· SIGNALING NETWORK AFTER INTERCONNECTION

INTER-NETWORK CONNECTION SYSTEM

This is a continuation of copending application Ser. No. 07/271,409, filed on Nov. 14, 1988, now abandoned, which is a continuation of Ser. No. 865,822, filed on May 23, 1986, now abandoned.

BACKGROUND OF THE INVENTION

1. Field of the Invention

The present invention relates to an inter-network connection system in a communication system. In particular, it relates to an inter-network connection system for mutually connecting a plurality of signaling networks using a common channel signaling system.

The common channel signaling system is a system wherein a speech path control signal is transmitted and received between signaling offices through a signal link, independently from a speech path, and commonly utilized by a plurality of speech paths, whereby a connection control of the speech path is carried out. In this system, a common channel signaling network comprising by the signal link is configured independently and separately from a telephone network comprising by the speech path or a data communication network comprising by data communication paths. The connection control of the telephone network and the data communication network is carried out by this common channel signaling network. This signaling system has various advantages, and thus has recently become generally utilized.

For example, as shown in FIG. 17, a telephone switched network comprising a plurality of telephone offices 01 to 04 and a data communication network comprising a plurality of data communication offices 05 to 08, etc., are interconnected by separate communication lines, i.e., a speech path and a data communication path respectively, so that the communication system is configured thereby.

Usually, a telephone call is carried out by dialing an office code (for example, 01, 02, 03, or 04) assigned to each telephone office, and a data call is carried out by dialing the office code (for example, 05, 06, 07, or 08) assigned to each data communication office, whereby the interconnections between an originating terminal and a destination terminal are carried out, respectively.

The telephone office code and the data communication office code, etc., are determined, respectively, as separate communication networks on the basis of the original numbering plan. Therefore, an efficient transmission of a great amount of the data becomes possible in spite of variations in the communication network and administrative structures thereof, by introducing a common channel signaling system, for example, a CCITT signaling system No. 7 as advised by the CCITT (International Telegraph and Telephone Consultative Committee).

When such a common channel signaling system is adopted, the call connection may be carried out by configuring the common channel signaling network, independently from the telephone switched network and the data communication network, then transmitting information of the destination office which is to be connected between the signaling offices 1, 1$i$, 1$j$, 2, 2$i$, or 2$j$ on the basis of the independent numbering plan.

When the signaling network is configured by a single administrative structure, the call connection is easily carried out by transmitting the information including an address (destination) information of the terminating signaling office, in the same way as with telephone switching or data is communicated.

However, when the signaling network is configured by a plurality of separate signaling networks, an inter-network connection between the separate signaling networks becomes necessary.

The inter-network connection system according to the present invention makes it possible to easily interconnect such common channel signaling networks developed independently by each region, each country, or each manufacturer.

2. Description of the Related Art

In the past, different signaling networks have been developed for each region, country, or manufacturer, and these signaling networks often have different network structures or administrative structures.

Two inter-network connection systems have been proposed for interconnecting these different common channel signaling networks. In one such system, all of the different signaling networks are integrated so that a new single signaling network containing all of those different signaling networks is configured (see FIG. 14). In another system, at least one signaling office chosen from among the signaling offices in a first signaling network is constituted as a gateway office. This office has a dual function of belonging to a second signaling network which is to be interconnected, as well as to the first network. The system also includes inter-network connection between the two networks (see FIG. 15, FIG. 16).

In signaling networks which are integrated, it is necessary to integrate the signaling office code plan, and the network control procedures in a different way. However, in general, such integration is difficult since, as described above, each signaling network has a different network structure or different administrative structure. Further, even if such integration is possible, on such an occasion each signaling office of each of the signaling networks must be provided with signaling network control information of the second signaling network to be connected as well as signaling network control information of the intra-signaling network. As a result, since there is usually a very great amount of such information, the signaling network control information to be stored at each signaling office becomes excessive.

Therefore, for such an integration, a great deal of work must be done to modify the signaling network control information at each signaling office, and this takes a long time. In particular, since this work must be done at all signaling offices of the signaling network to be integrated, it may take a very long time. Further, as communication services must be discontinued during such modifications, there is a serious deterioration in the quality of service. Furthermore, if it is necessary to modify the signaling network structure of one signaling network among the integrated signaling networks after such integration, all of the signaling network control information in all of the integrated signaling networks must be modified. Therefore, the amount of work for maintenance becomes excessive.

In systems with a gateway office having a dual function, the realization of such a system is easier in comparison with the above integrated signaling networks aforementioned system. However, the gateway office having a dual function still must be provided with the network control information of the both signaling networks to be interconnected, and when the network structure of the second signaling network must be modified, a great deal of modifying work corresponding to that modification must be carried out.

SUMMARY OF THE INVENTION

It is an object of the present invention to provide an inter-network connection system that easily carry interconnects signaling networks without a great amount of modifying work.

According to a fundamental aspect of the present invention, there is provided an inter-network connection system for interconnecting a plurality of signaling networks using a common channel signaling system wherein, each of the signaling networks comprises one or more signaling offices; at least one of the signaling offices of the signaling network is chosen as a gateway office by each network; and one or more local signaling networks, comprising by the gateway office of one signaling network and the gateway office of another signaling network to be interconnected, is configured between the plurality of signaling networks. The inter-network connection between the plurality of signaling networks is accomplished with a local signaling network, which is configured between the signaling networks to be interconnected.

According to another aspect of the present invention, there is provided a signal transmission system for transmitting a signal through a plurality of exchanges wherein an origination exchange sets a destination of the signal to one exchange as a gateway office and transmits the signal. A tandem office exchange determines and changes the destination of the signal to be next transmitted, and transmits the signal to the next exchange, whereby gateway exchanges change the destination of the signal in sequence and finally transmit the signal to the termination exchange.

BRIEF DESCRIPTION OF THE DRAWINGS

The inter-network connection system in accordance with the present invention will now be described with reference to the accompanying drawings, in which;

FIG. 9 shows the routing table;

FIGS. 10, 10a–10c, 11, 11a, 11b, 12, 12a and 12b are flow-charts showing the signal transmission and reception procedure carried out at the signaling office;

FIG. 14 to FIG. 16, respectively, show inter-network connection systems of the related art, and;

DESCRIPTION OF THE PREFERRED EMBODIMENTS

A preferred embodiment of the present invention will now be explained with reference to FIGS. 1 to 13.

1. Structure of the System

Figure 1:
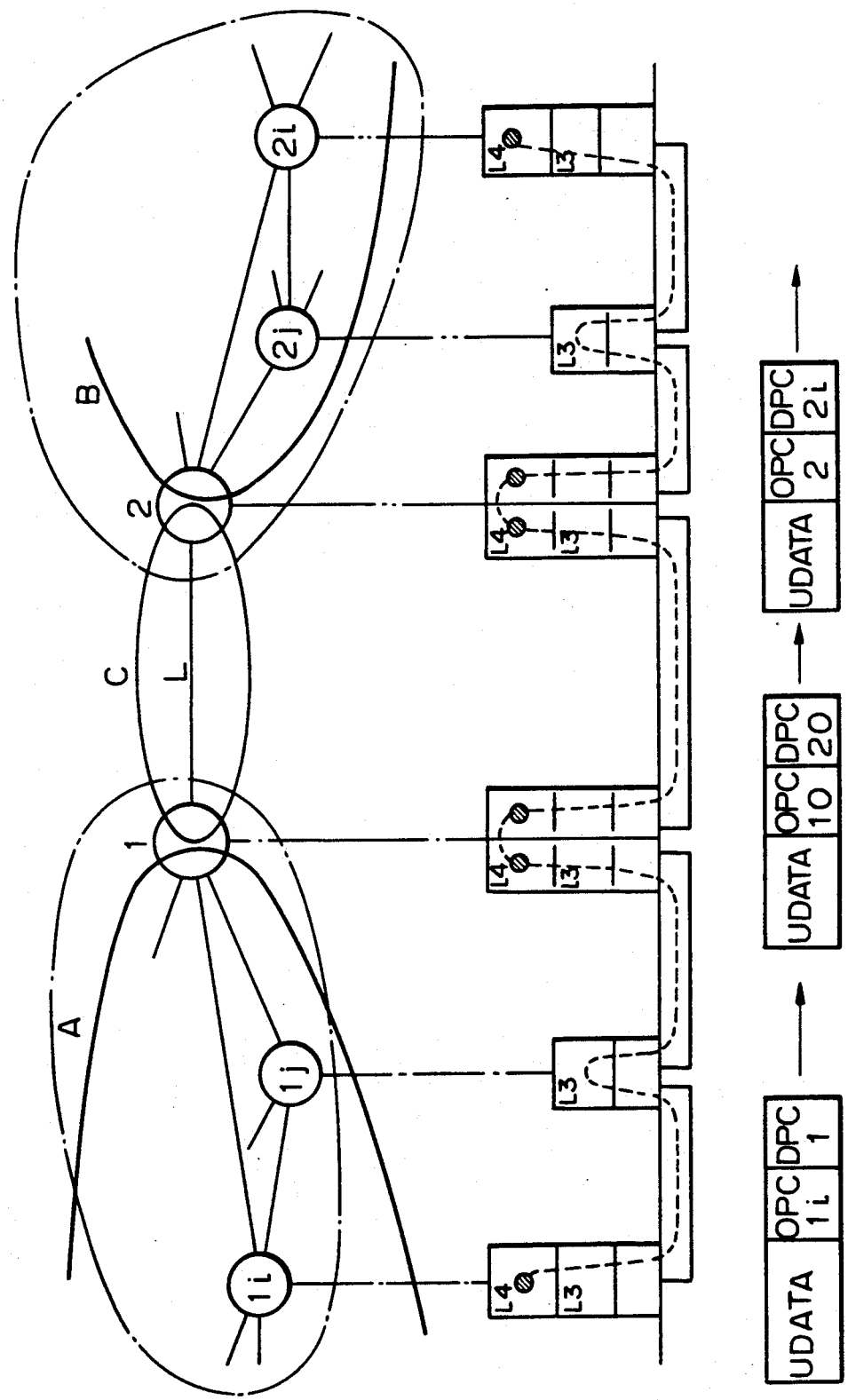
FIG. 1 shows a communication system for carrying out the inter-network connection system according to the present invention.

Two signaling networks are part of an inter-network connection according to an embodiment of the present invention, which is shown in FIG. 1. In FIG. 1, a signaling network A and a signaling network B are networks to be mutually interconnected, and these signaling networks A and B have a different signaling network structure or administrative structure, respectively. However both of these signaling networks use a common channel signaling system. Both the signaling networks A and B comprise a plurality of signaling offices. However, in FIG. 1, only signaling offices 1, 1$i$, 1$j$ of the signaling network A and signaling offices 2, 2$i$, 2$j$ of the signaling network B are shown for simplification.

The signaling offices 1 and 2 are gateway offices arbitrarily selected from among the signaling offices of the respective signaling networks A and B. A signal link L is set up between the gateway offices 1 and 2. These gateway offices 1 and 2, and signal link L, constitute a local signaling network C. Therefore, the gateway office 1 belongs to both the signaling networks A and C, and the gateway office 2 belongs to both the signaling networks B and C. The gateway office 1 is provided with control data of the signaling networks A and C as network control information for transferring a signal, and the gateway office 2 is provided with control data of the signaling networks B and C.

Figure 2:
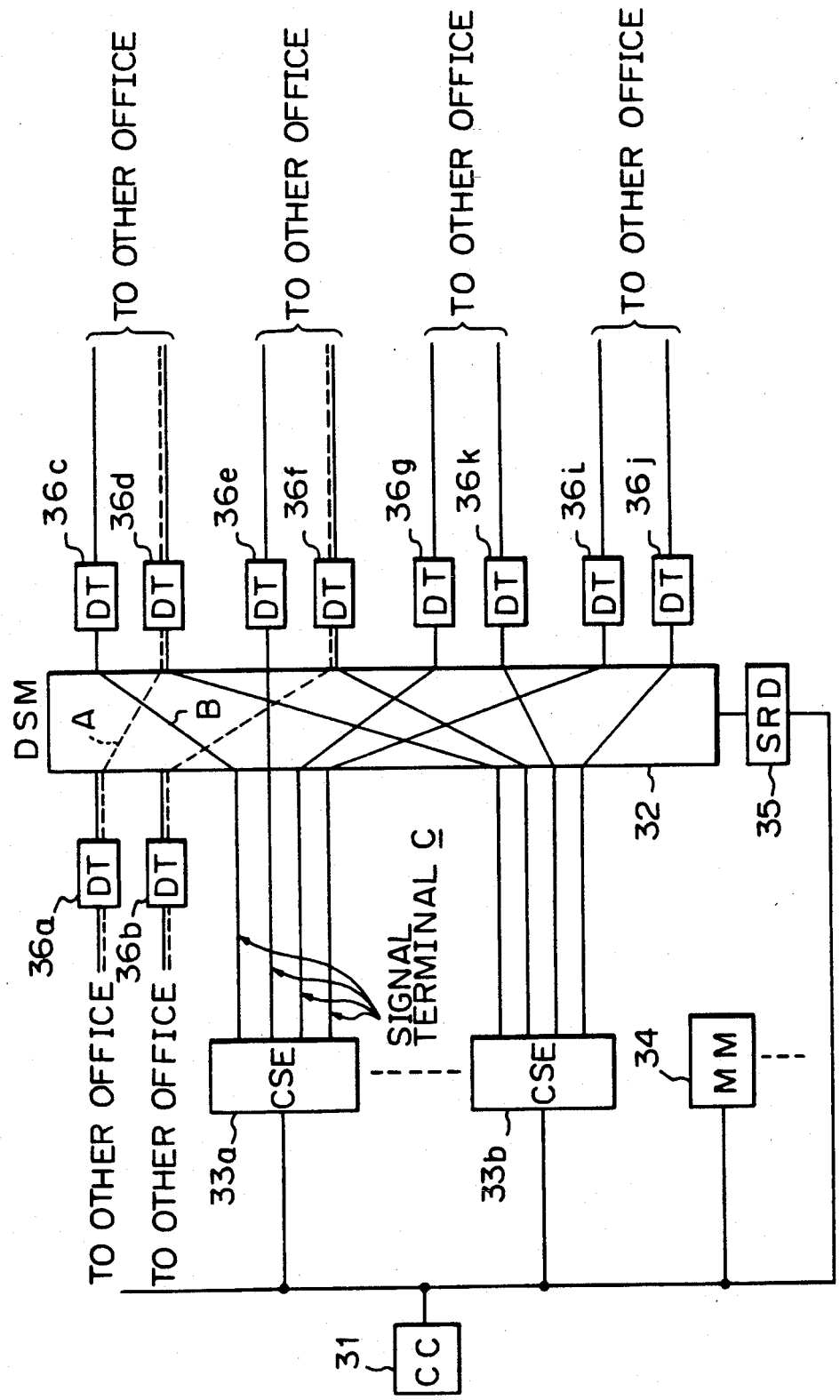
FIG. 2 is a block diagram showing an example of the signaling office of FIG. 1.

An example of a structure of the signaling office in FIG. 1, is shown in FIG. 2. In FIG. 2, a central controller unit (CC), 32 a digital switch module (DSM), 33$a$ and 33$b$ common channel signaling equipment (CSE), 34 a main memory (MM), 35 a signal receiver and distributor (SRD), and 36$a$ to 36$j$ digital terminals (DT).

The memory 34 stores various control programs such as a common channel control program used for the control of the interconnection within the intra signaling network and between different signaling networks as well as administration data, etc. The execution of these program is carried out under the control of the controller 31. The transmission and reception of a signal unit for the other signaling networks are carried out by the common equipment 33$a$ and 33$b$. This signaling network and the other signaling network are interconnected by a PCM (pulse code modulation) link set up between the terminals 36$c$ to 36$j$, and at least one of the time slots (channel) of the PCM link is used as a common channel signal link.

The terminals 33$a$ and 33$b$ and the time slots in the terminals 36$c$ to 36$j$ are interconnected by a switching operation of the module 32. The control information for connecting a speech path A and a signal link B, etc., stored in the memory 34 is transmitted to the module 32 through the receiver and distributor 35 under the control of the controller 31. The module 32 carries out the switching operation by using this information.

Figure 3:
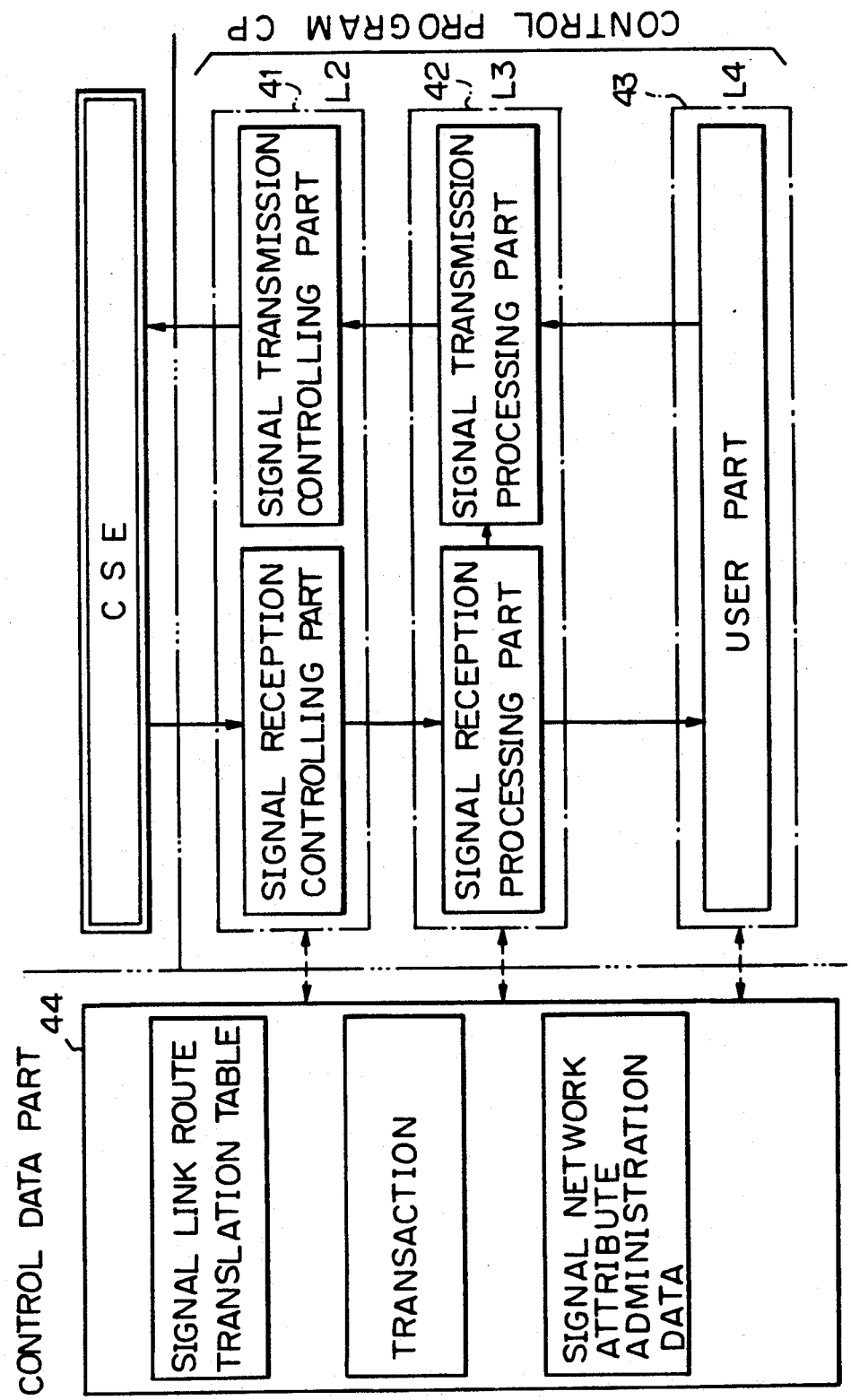
FIG. 3 is an equivalent function block diagram of the main memory in FIG. 2.

An epitomized example of the common channel signal control program and the administration data stored in the memory 34 are shown in FIG. 3. The control program CP may be represented by the equivalent functional blocks. Various functions carried out at each signaling office are represented as function levels L2, L3, and L4. The level L2 represents signal link control function parts, the level L3 represents signal transfer function parts, and the level L4 represents user function parts, respectively.

The function blocks of the control program of the memory 34 correspond to these function parts. That is, the function blocks comprise a common channel signaling equipment controlling part 41 belonging to the level L2, a signal transfer part 42 of the level L3, and the user part 43, etc. The common channel signaling equipment controlling part 41 comprises a signal reception controlling part and a signal transmission controlling part. The signal transfer part 42 comprises a signal reception processing part and a signal transmission processing part. The user part 43 functions, for example, to carry out a call processing control by analyzing the information of the signal. The control data part 44 comprises a signal link route translation table, a transaction, and signaling network attribute administration data, etc.

Figure 4:
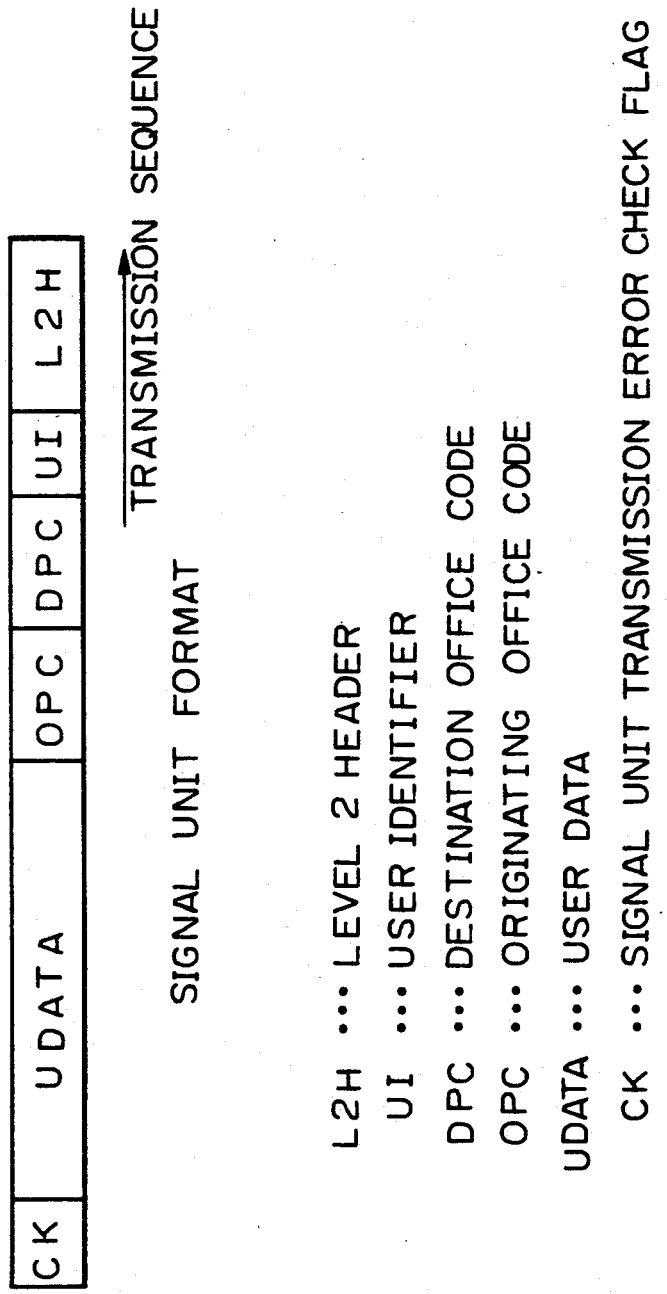
FIG. 4 shows a signal unit for transmitting and receiving between the signaling offices of FIG. 1.

A format of the signal unit transmitted and received between a first and other signaling networks is shown in FIG. 4. In FIG. 4, L2H is a level 2 header which is a field for a sequence control and error control of the signal unit at level 2 in order to transfer the signal unit. UI is a user identifier which is a representation for distinguishing, for example, a telephone user part or a data user part. DPC is a destination office code, OPC an originating office code. UDATA is user data comprising, for example, a telephone call destination number, a telephone call originating number, a speech path number, and a telephone subscriber's number. CK is a signal unit transmission error check flag for detecting a bit error at the time of transmission of the signal unit.

Figure 5:
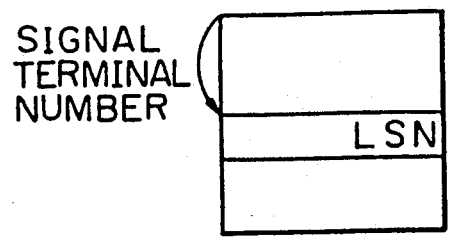
FIG. 5 shows details of the signal link route translation table of FIG. 3.
Figure 6:
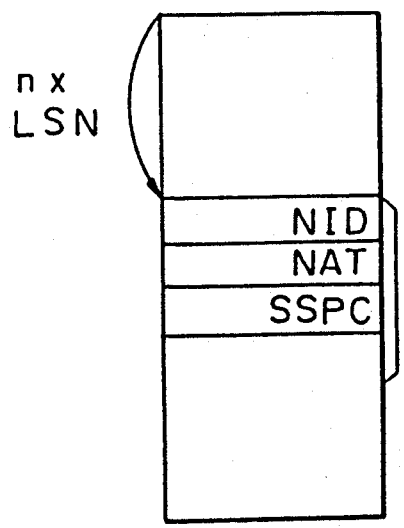
FIG. 6 to FIG. 8 show various translation tables in the signaling network attribute administration data of FIG. 3.
Figure 7:
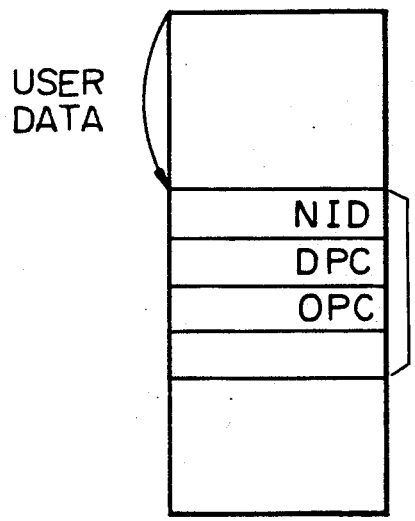
Figure 8:
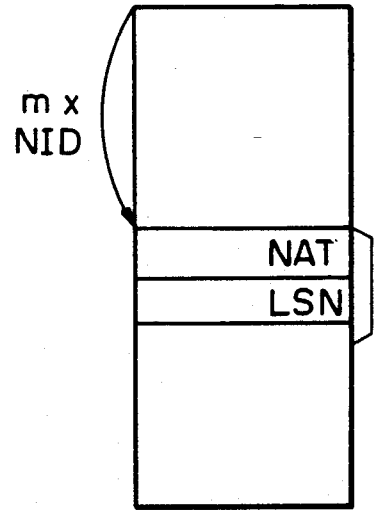

A detailed structure of the signal link route translation table in the control data of FIG. 3 is shown in FIG. 5, and examples of detailed structures of the signaling network attribute administration data are shown in FIG. 6 to FIG. 8. FIG. 5 shows a signal link route number translation table, which is used for looking up the signaling network attribute, etc., by using the number of the signal terminal C in FIG. 2 as an index when the signal is input.

FIG. 6 shows a signal link route-signaling network attribute translation table. This table is used to look up the signaling network attribute, etc., by using the signal link route number as an index. In FIG. 6, NID is a signaling network identifier, NAT is a signaling network attribute, and SSPC is a first office code. The signaling network identifier NID is an indication for distinguishing the signaling network, for example, to distinguish whether the signaling network in FIG. 1 is A, B, or C. The signaling network attribute NAT is an indication of the signaling network configuration, for example, to indicate whether the network is a point-to-point system signaling network such as the signaling network C, or a signaling network which carries out the routing process such as the signaling network A and B.

Note, routing is a process by which the existence and the availability of the signal route to the directed signaling office is checked on the basis of a routing table administrated at each signaling office, as shown in FIG. 9. The routing table contains information for each number of the signaling link route, which information relates to the signaling office for transmitting and receiving the signal to or from the signaling office within the intra signaling network on the signal link route. With this information, the existence of the signal route to the directed signaling office, the status of the possibility of access to the signaling office, and the status of the availability of the signal route, etc., can be determined. FIG. 9 shows an example of the table structure of the routing data for the signaling offices having the signaling office codes a and b respectively.

FIG. 7 shows a user data-signaling network identifier translation table. This table looks up the network identifier etc. by using the user data UDATA in the signal unit as an index. The contents are, the signaling network identifier NID, the destination office code DPC, and the originating office code OPC. FIG. 8 shows a signaling network identifier-signal link route translation table. This table looks up the signaling network attribute NAT and the signal link route number LSN, etc., from the signaling network identifier.

Operation of the System

The operation of the inter-network connection in the signaling network constituted as described above will be explained hereinafter with reference to FIG. 10 to FIG. 12.

Assume that the signal is transferred from an arbitrary signaling office 1*i* in one signaling network A to a signaling office 2*i* in the other signaling network B in FIG. 1, and a speech path (not shown) is set up therebetween. The signal transfer is carried out by transmitting the signal from the signaling office 1*i* through the signaling office 1*j* and the gateway office 1 in the signaling network A, the local signaling network C, and the gateway office 2 and the signaling office 2*j* in the signaling network B to the signaling office 2*i*.

In the middle portion of FIG. 1, the function levels of the process for transferring of the signal, at each signaling office that the signal passes through at the time of the signal transfer, are shown. In the lower portion of FIG. 1, the schematic signal units at each signaling network are shown. First, when a call from a user at the signaling office 1*i* of the signaling network A is generated to a user at the signaling office 2*i* of the signaling network B, the signaling office 1*i* analyzes the content of the user data by means of the user part of the level L4. As a result of this analysis, if the call originating signal is distinguished as being directed to the signaling network B, then that signal is transmitted to the gateway office 1 in the signaling network A. At the time of transfer of the signal, if necessary, the signal is transferred to the gateway office 1 via the signaling office 1*j*. Since the control operations in the signaling offices 1*i* and 1*j* are fundamentally the same as the operation of the gateway office described later, a detailed explanation of the operation is omitted here.

Figure 10B:
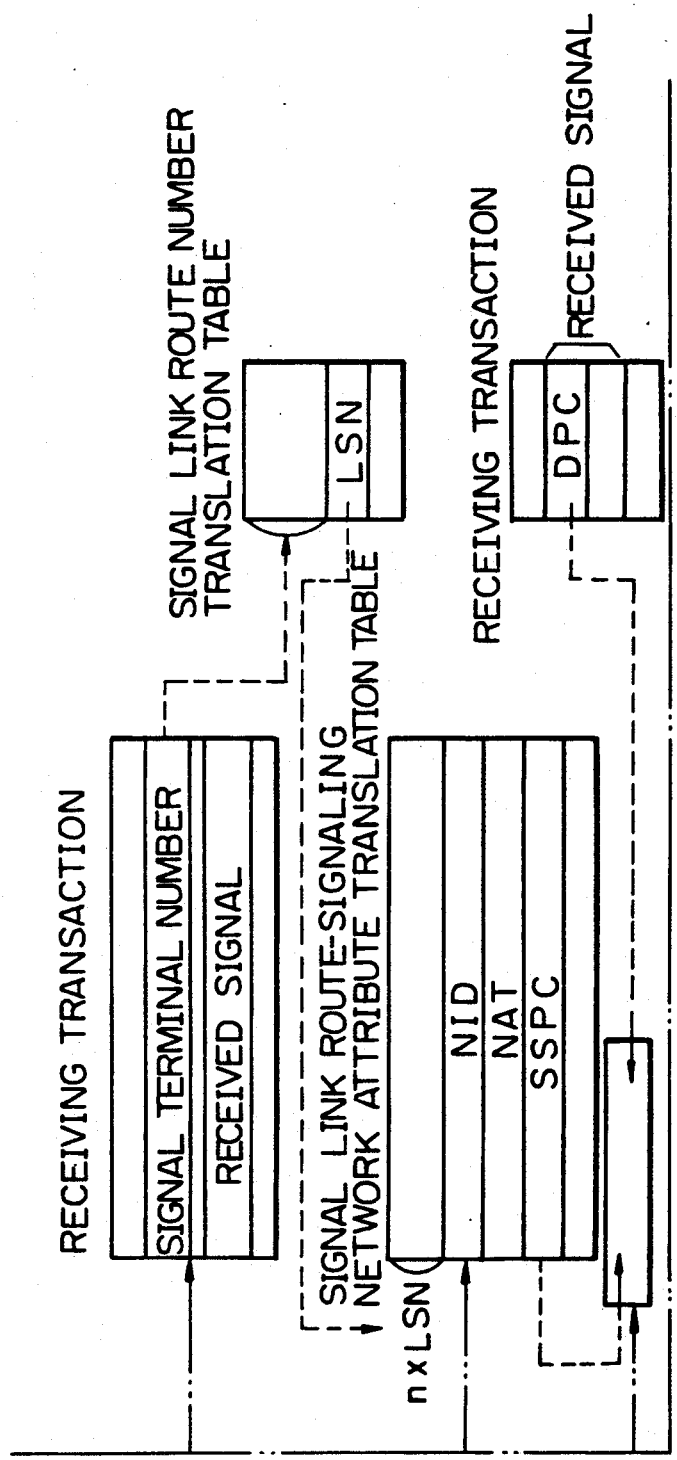
Figure 10C:
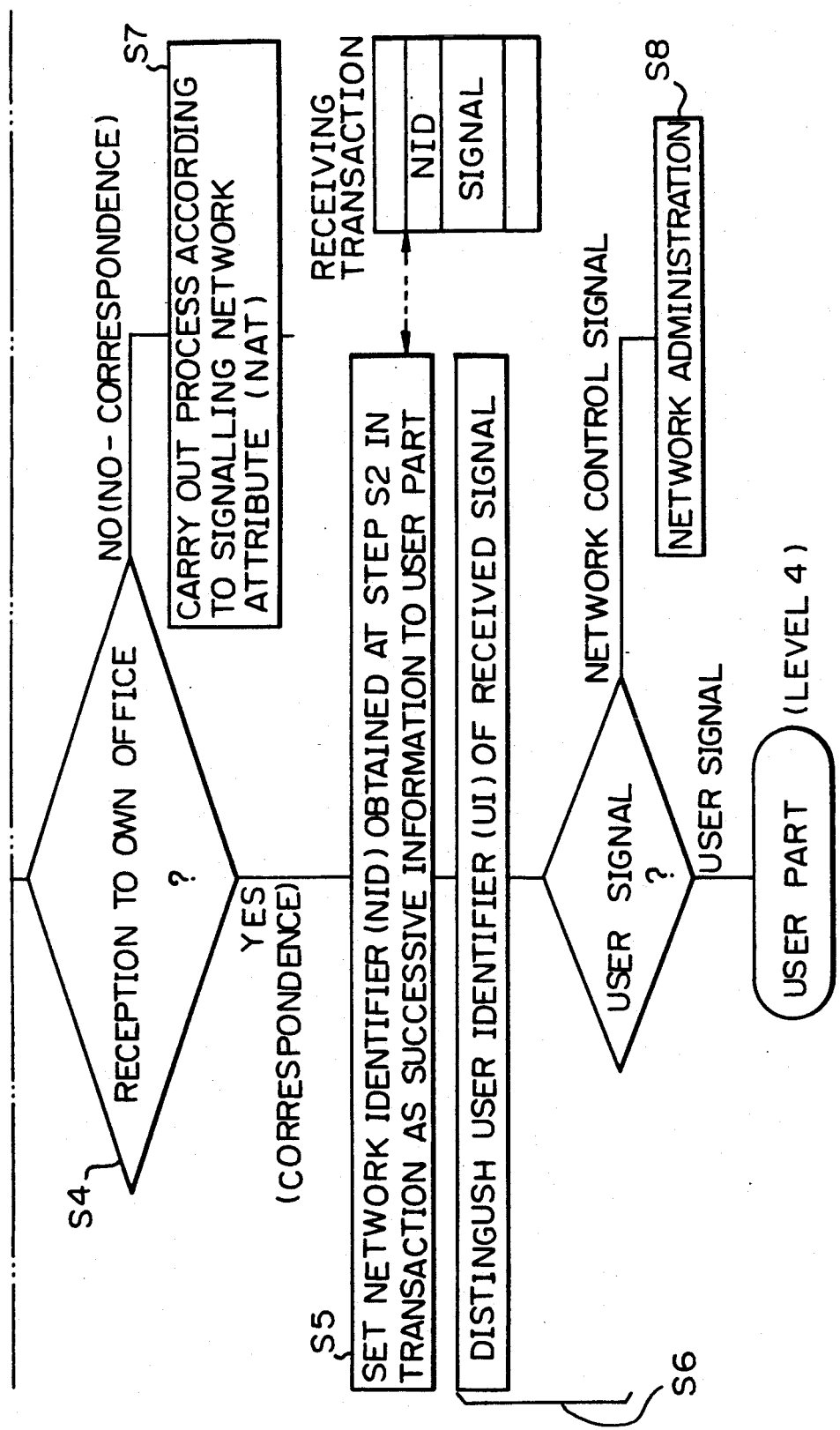

When the signal generated at the signaling office 1*i* is simply transferred through the signaling office 1*j* and received at the gateway office 1, the gateway office 1 processes the received signal in accordance with the procedure shown in the flow charts of FIG. 10 to FIG. 12. FIGS. 10a–10c comprise a flow chart showing a procedure at the signal reception processing part 42 in FIG. 3 of the level L3. FIGS. 11a and 11b comprise a flow chart showing the procedure at the user part 43 in FIG. 3 of the level L4, and FIGS. 12a and 12b comprise a flow chart showing the procedure at the signal transmission processing part 42 in FIG. 3 of the level L3.

Schematically, the process in the gateway office 1 is as follows. That is, after setting up the speech path between the signal generating office 1*i* and the gateway office 1 within the signaling network A, the transmission of the signal toward the gateway office 2 in the signaling network C is demanded, and the gateway office 1 transmit the signal after confirming that transmission of the signal toward the gateway office 2 is possible. A detailed explanation of this operation will be given hereinafter.

In a gateway office 1, the received signal of 5 FIG. 2 is input to one of the signal terminals of the equipment 33a or 33b through one of the terminals 36a to 36j and the module 32, whereby the controller 31 carries out the control procedure shown in FIGS. 10a -10c by using the data of the memory 34. That is, the signal terminal number of the equipment 33a or 33b to which the signal is input and the content of the received signal are stored during the receiving transaction. At the same time, the signal terminal number is translated into the signal link route number by using the signal link route number translation table of FIG. 5 (step S1), further, the signaling network identifier NID, the signaling network attribute NAT, and the first office code SSPC are obtained from the signal link route number using the signal link route-signaling network attribute translation table of FIG. 6. (step S2).

Next, the destination office code DPC contained in the received signal and the first office code SSPC obtained at the step S2 are compared (step S3), thereby distinguishing whether the received signal is destined for the first office or not (step S4). When the received signal is destined for the first signaling office, the codes correspond, and when destined for another signaling office, the codes do not correspond. When there is no correspondence, the receiving office simply transfers the signal to the other signaling office, and a transfer process corresponding to the signaling network attribute NAT is carried out at the level L3 without carrying out the process of the level L4. This process corresponds to the process at the signaling office 1j.

When it is determined that the received signal is destined for the first signaling office, the process of the level L4 is carried out for the received signal. However, prior to that process, the signaling network identifier NID obtained at step S2 is stored during the receiving transaction as the successive information to the user part (step S5). After that, it is determined whether the received signal is the user signal from the user or not (step S6). When it is identified as a signal other than the user signal, for example, a network control signal, the network administration, etc., is carried out without going to the level L4 process (step S8).

When the received signal is identified as the user signal, the inter-network connection process of the level 4, by the user part 43 shown in FIG. 11, is carried out. In the user part 43, the user data, such as a telephone number, in the received signal is analyzed. Using the user data-signaling network identifier translation table shown in FIG. 7, the signaling network identifier NID, originating office code OPC, and destination office code DPC, etc., of the signaling network to which the speech path is to be set up are obtained from the user data (step 11). In the present example, the signaling network identifier NID indicates the signaling network C, the originating office code OPC indicates the signaling office 10, which is the code of the gateway office 1 relating to the signaling network C, and the destination office code DPC indicates the signaling office 20 which is the code of the gateway office 2 relating to the signaling network C.

Next, the speech path is set up between the signal originated office 1i and the gateway office 1 on the basis of the signaling network identifier NID of the signal originating office (here, the signaling network A), the originating office code OPC in the received signal (here, the signaling office 1i), and the user data UDATA in the received signal, etc, (step 12).

Subsequently, the signal unit containing the originating office code OPC, and the destination office code DPC, which are obtained as a result of the analysis, as well as the user data of the received signal, is re-edited and stored into the transmission transaction memory. Then, indicating that the network identifier NID is obtained at step S11, transmission of the signal is demanded for the signal transmission processing part (steps 13). That is, the edited signal unit comprises the originating office code OPC indicating the signaling office 10, and the destination office code DPC indicating, the signaling office 20 which belong to network C, etc.

In the signal transmission processing part 42 in FIG. 3, in order to carry out the transmitting process of the signal, the signaling network attribute NAT and the signal link route number LSN are obtained by means of translating the signaling network identifier NID (signaling network C) succeeding the user part 43 using the signaling network identifier-signal route translation table (step S21). Then, the procedure is branched by the signaling network attribute NAT. In this example, the signaling network attribute NAT is the signaling network C of the point-to-point type. The procedure proceeds to step S23 wherein the signal link within the signal link route number LSN obtained at step S21 is selected, and the transmission control operation is demanded for the common channel signaling equipment controlling program. On the other hand, when the signaling network attribute NAT is such as that in networks A or B, which need the routing process, the procedure goes to step S24 wherein the routing process according to the signaling network attribute is carried out and the transmission controlling operation is demanded for the common channel signaling equipment controlling program.

According to the operation described above, the signal generated at the signaling office 1i reaches the gateway office 1 of the signaling network A so that the speech path is set up, and then the signal is transferred in the signaling network C from the gateway office 1 (10) toward the gateway office 2 (20).

In the gateway office 2, a process the same as that of the gateway office 1 is repeated. That is, after confirming at the user part 43 that the received signal is destined for the signaling network B by analyzing the user data, the speech path is set up between the gateway office 1 (10) and the gateway office 2 (20). Then the transmission of the signal toward the signaling office 2i in the signaling network B is demanded for the signal transmission processing part 42. In this case, the signaling network identifier NID is the signaling network B, the originating office code OPC is the signaling office 2, and the destination office code DPC is the signaling office 2i. Then, the signal unit containing this information is re-edited at the gateway office 2 and transmitted to the aimed signaling office 2i. Since the connection control procedure hereafter is the same as that of the connection control procedure of the prior art, an explanation thereof will be omitted.

In the above description, the inter-network connection from the signaling network A to the signaling network B is described. The inter-network connection from the signaling network B to the signaling network A is exactly the same, and it is clear that the connection between signaling offices in each signaling network need not always go through the tandem offices 1j and 2j.

As described above, when tandem offices 1j and 2j comprise as the signaling office only and not the speech path control office, the speech path is set up in sequence from 1i via 1 (10) and 2 (20) to 2i. The signaling network A containing signaling office 1i, 1j, and 1, and the signaling network B containing the signaling offices 2, 2j, and 2i are interconnected through the signaling network C newly configured by gateway offices 1 and 2 having a dual function and belonging to the signaling networks A and B, respectively. As a result, it is sufficient for each signaling office in the signaling network A to hold only the data for judging whether the generated call is the signal destined for the signaling network B, and to hold the control data for transferring that signal to the gateway office 1 with regards to the internetwork connection between the signaling networks A and B. It also is sufficient that the gateway office 1 holds only the data for connecting between signaling offices in the signaling network A and the data for connecting to the gateway office 2 in the signaling network C, and therefore, the connection data for the signaling network B is not necessary.

As a result, the separation of the signaling networks to be connected is achieved, and at the same time, the number of contact points to which both signaling networks must be connected is decreased due to the local signaling network C, which absorbs the difference of the signaling network structure to be connected and the differences of the detailed connection procedure and the network administration procedure, such as a recent change procedure, etc., whereby the network design such as a network code design can be carried out at individual networks independently. Therefore, the modification of the network structure of one signaling network does not influence the other signaling networks. Further, the data to be held at each signaling office for inter-network connection is limited and only a small amount, thereby the administration of variable data for the signal transfer, for example, the data of the administration and supervisory, etc. for the status variation of the route become unnecessary in most cases.

Figure 14:
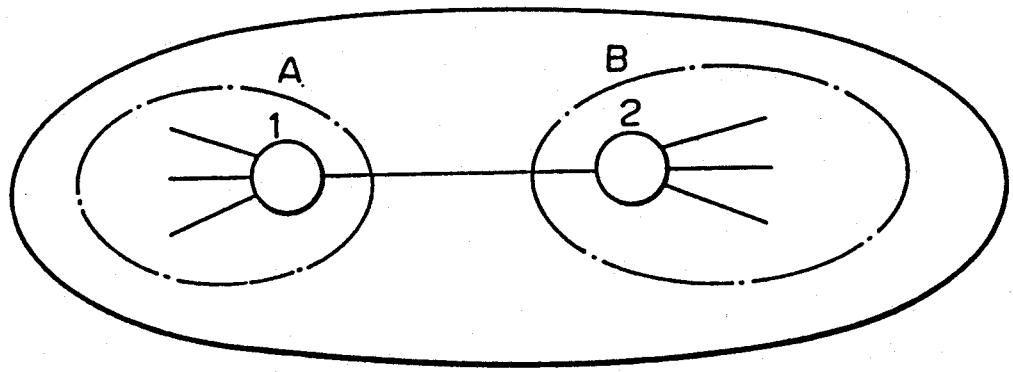
Figure 17:
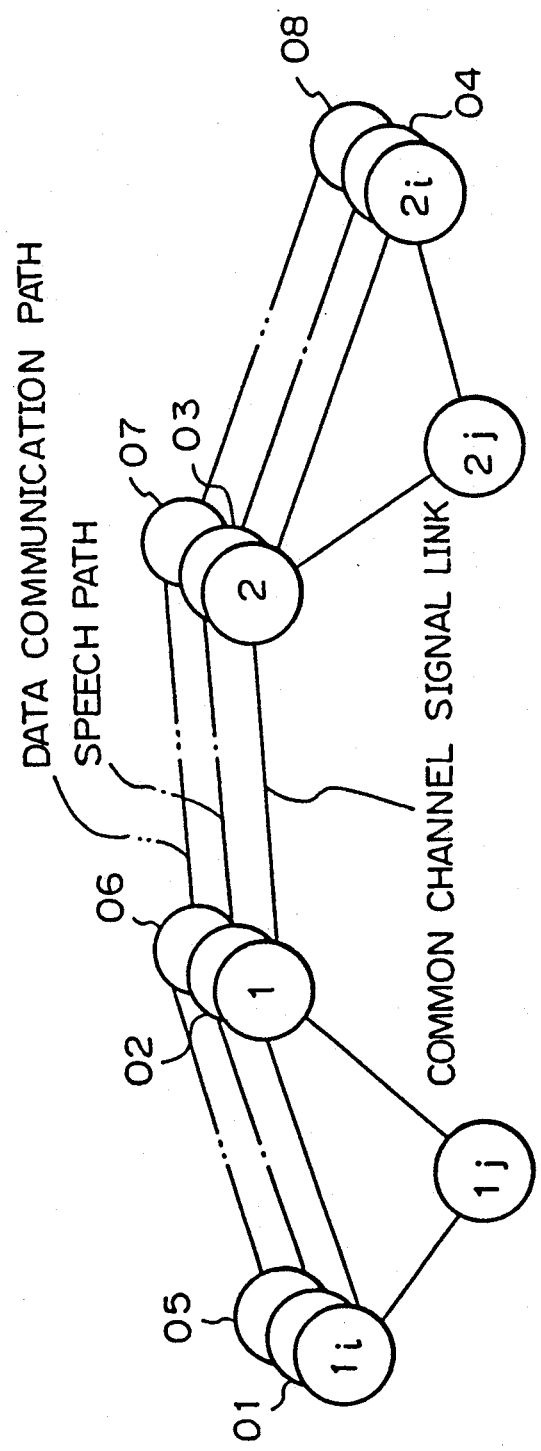
FIG. 17 is a drawing for explaining the background of the signaling network.

It is clear from FIG. 9 that it is sufficient if only a small amount of data is held by each signaling office. That is, it can be easily discerned that, in the system as shown in FIG. 14 wherein all signaling offices are integrated into a single signaling network, there exist a problem in that the amount of data to be held at each signaling office becomes excessive. On the other hand, in the system of FIG. 15 or FIG. 16, it is enough for only the gateway office to hold the data of each signaling office in a second signaling network in addition to the data of each signaling office in a first signaling network. However, regarding the gateway office, the amount of data to be held also becomes excessive, and in order to cope with an increase in the signaling offices of the other network and the modification of the signaling office code, a complicated modification procedure is similarly necessary.

On the contrary, in the inter-network connection system according to the present invention described above, it is sufficient if the signaling offices in the signaling network A hold the data of the signaling office in the signaling network A, as in the prior art. Also, it is sufficient for signaling offices in the signaling network B to hold the data of the signaling office of the signaling network B, as in the prior art. Further, it is sufficient for the gateway office to hold only the data of the newly configured signaling network C in addition to the data of the first signaling network (network A or network B). Therefore, according to the present invention, it is clear that the amount of data is decreased and one signaling network has very little influence with regard to the modification of the other signaling network, in comparison with the prior art system.

Description of Modification

Figure 13:
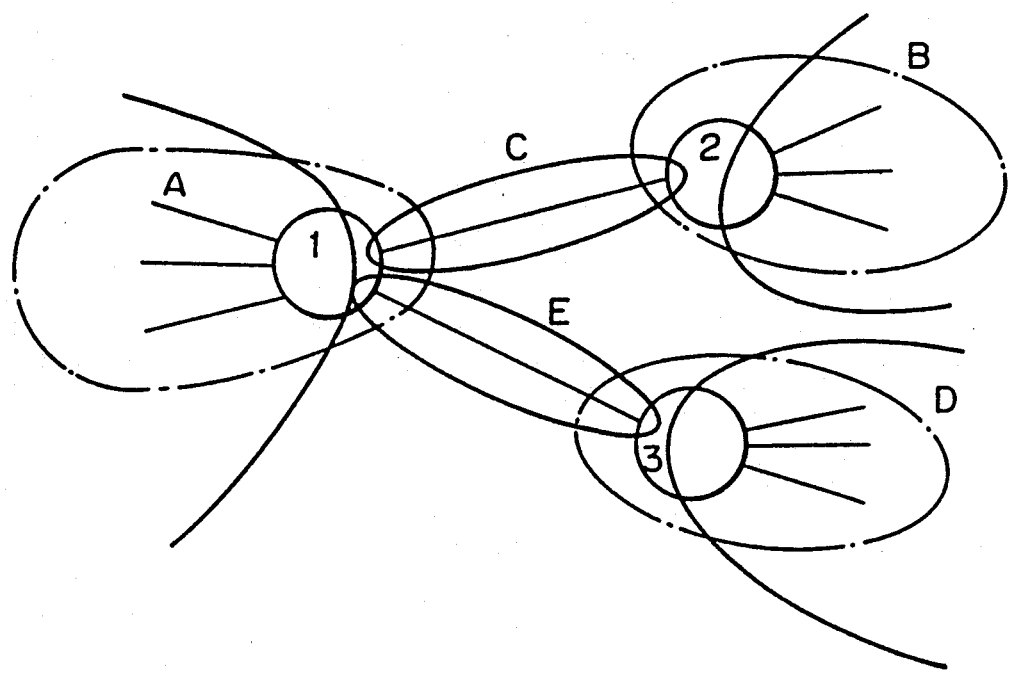
FIG. 13 shows a modification of the present invention.

Various modifications are possible in carrying out the present invention. For example, as shown in FIG. 13, the gateway office 1 of the signaling network A can be included in not only the local signaling network C including the gateway office 2 of the signaling network B but also a new local signaling network E including a gateway office 3 of a different signaling network D. That is, the system may be connected so that the gateway office 1 has a triple function and belongs to the signaling networks A, C, and E, whereby an inter-network connection between the signaling networks A, B, and D, becomes possible. Of course, the gateway office 1 may further belong to many other signaling networks, and the gateway offices 2 and 3 may belong to numerous signaling networks. Further, for example, the local signaling network of the gateway office 1 for the signaling network B is not limited to the local signaling network C. It is possible to connect the local signaling network C' between the gateway office 1 and the different gateway office 2' in the signaling network B. Thus, as the number of signaling networks to be connected increases, the effect of reducing the amount of data and the effect of preventing an influence on the other signaling networks due to a modification of the structure of the signaling network, which are obtained by the present invention, become even more remarkable.

According to the present invention, it is not necessary for the signaling offices of each signaling network to hold the network control data of all signaling offices in the other signaling network to be connected, in order to carry out the inter-network connection. Thus the amount of work for realizing the interconnection between signaling networks does not become excessive, and therefore the inter-network connection is easily realized. Each signaling network becomes independent of the other signaling network by placing the local signaling network therebetween, whereby influence from modification to the network structure in one signaling network over the other signaling network is prevented so that the amount of work accompanying the modification to the network structure at each signaling network, after the establishment of the inter-network connection, can be kept to a minimum. Further the network design such as the office code design are made possible for individual networks, and thus the degree of freedom in design at each signaling network can be increased.

What is claimed is:

1. A inter-network connection system for interconnecting a plurality of independent common channel signaling networks, said connection system comprising:
a plurality of independent common channel signaling networks wherein each of said independent common channel signaling networks comprises one or more signaling offices identified by corresponding office numbers and each signaling network has a signaling code that is independent of the other independent common channel signaling networks so that a given office number can be assigned to signaling offices in different independent common channel signaling networks, and in each of said independent common channel signaling networks, one of said signaling offices being connected to function as a gate way office; and a local signaling network comprising a point to point system including at least two gateway offices of respective ones of said independent common channel signaling networks, each of said gateway offices including:

means for transmitting a signal unit comprising at least user data, an originating office code, and a destination office code, from one of said independent common channel signaling networks to another one of said independent common channel signaling networks, and each of said independent common channel signaling networks including:

one of said signaling offices corresponding to an originating office and including means for setting the user data, the originating office code and the destination office code in the signal unit and for sending the signal unit to the gateway office in said one of said independent common channel signaling networks, the gateway office in said one of said independent common channel signaling networks including:

first changing means for changing the signal unit by selecting at least one of an originating office code and a destination office code on the basis of the user data so as to identify the gateway office of said another independent common channel signaling network and for transmitting the signal unit through said local signaling network including both gateway offices, and the gateway office in said another one of said independent common channel signaling networks including:

said changing means for changing the signal unit by selecting at least one of an originating office code and a destination office code on the basis of the user data so as to identify a termination office and for transmitting the signal unit to the termination office.

2. A signal transmission system for transmitting a signal including user data through a plurality of independent common channel signaling exchanges each having a corresponding numbering system that is independent of the numbering system of the other independent common channel signaling exchange so that a given number can be used in different independent common channel signaling exchanges, said system comprising:

an origination exchange means, having a first one of said numbering systems, for setting a destination of the signal to one of said plurality of independent exchanges and for transmitting the signal including the destination of the signal to said one of said plurality of independent exchanges;

a plurality of changing means, respectively connected to corresponding ones of said independent exchanges, for receiving the signal, for changing said destination of the signal by selecting a destination based on the user data of the received signal so as to identify another one of said plurality of independent exchanges, and for transmitting the signal including the changed destination of the signal to said another one of said independent exchanges as a destination signal; and a destination exchange, having a second one of said numbering systems, for receiving the signal.

3. A signal transmission system according to claim 2 wherein each of said changing means comprises a gateway exchange interconnected between a plurality of networks.

4. An inter-network connection system comprising:

a first independent signaling network, having a first numbering system, and including a first signaling office connected as a gateway office means, and an originating office means for setting user data, a destination code and an origination code of information to be transmitted to said first gateway office means;

a second independent signaling network having a second numbering system that is independent of the first numbering system so that a given number can be used in each of the first and second numbering systems, and including a second signaling office connected as a second gateway office means for selecting at least one of a destination code and an origination code of the information received from the first gateway office means based on the user data, and a destination office means for receiving the information from the second gateway office means based upon the destination office code changed by said second gateway office means;

a local signaling network interconnecting the first and second independent signaling networks and comprising:

said first signaling office of said first independent signaling network; and said second signaling office of said second independent signaling network communicating with said first independent signaling office within said local signaling network.

* * * * *